Figure 1:
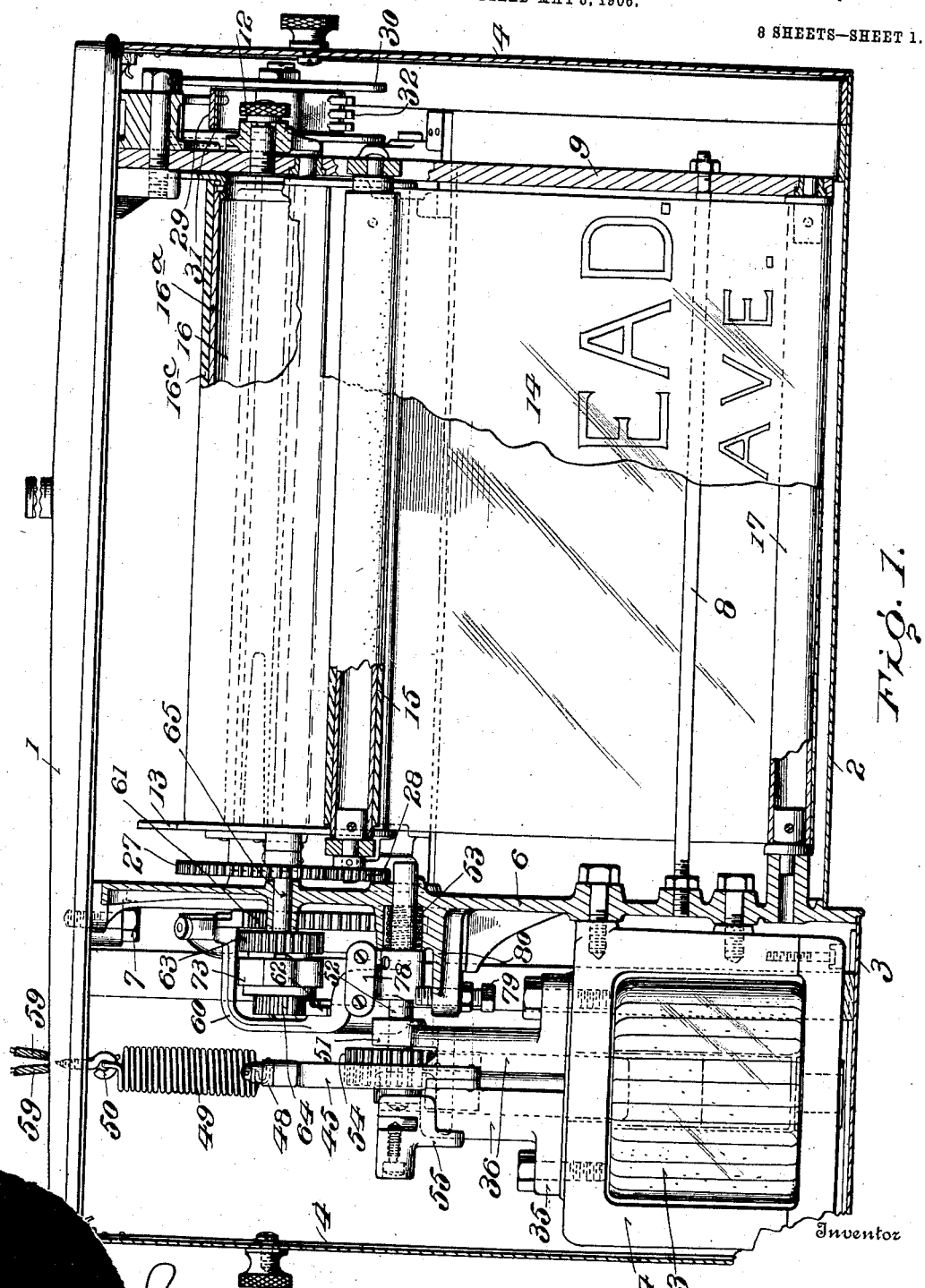

No. 838,126. PATENTED DEC. 11, 1906.
P. J. MANN.
STATION INDICATOR.
APPLICATION FILED MAY 3, 1906.

8 SHEETS—SHEET 2.

Witnesses
Inventor
P. J. Mann.
By Lacey, Attorneys

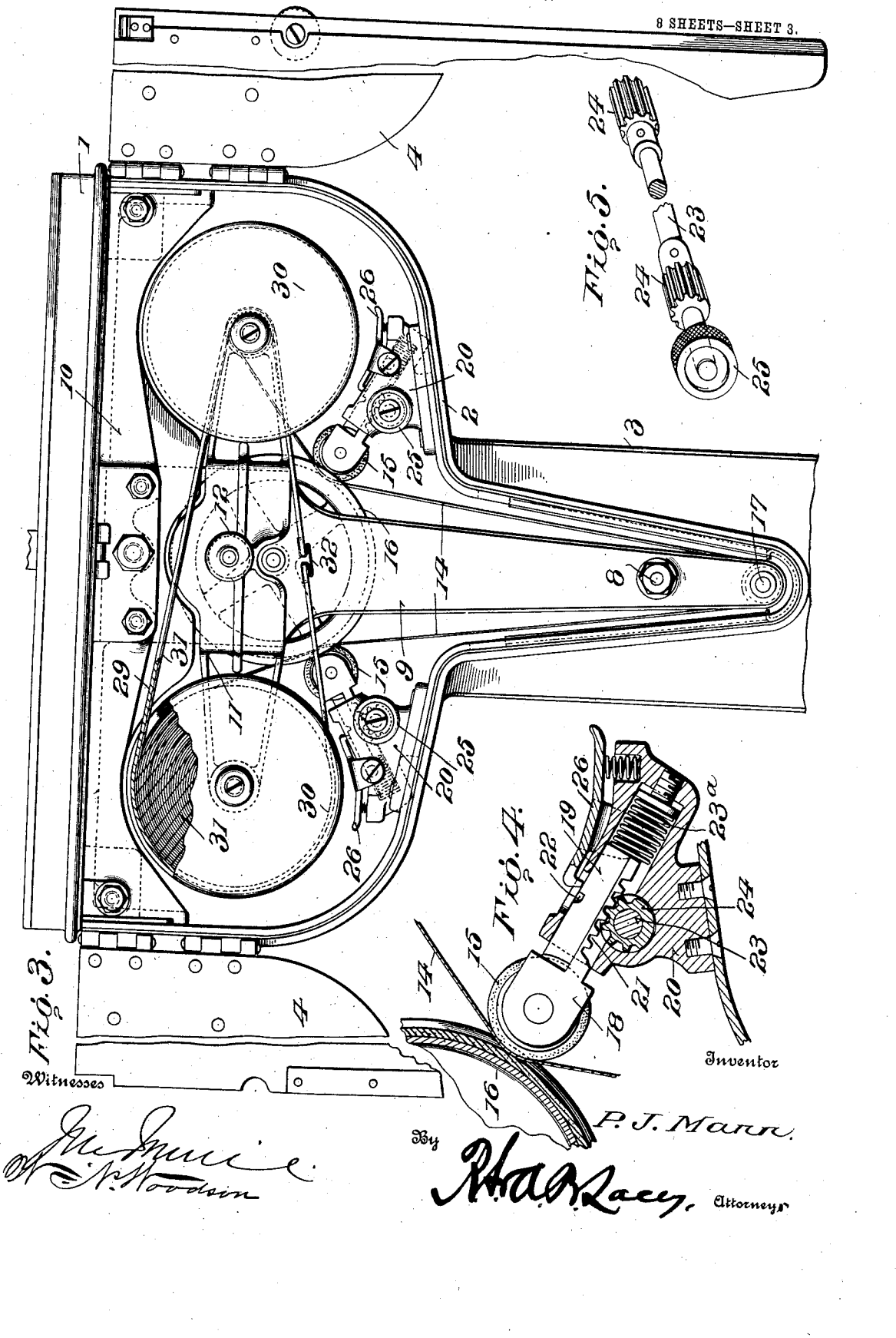

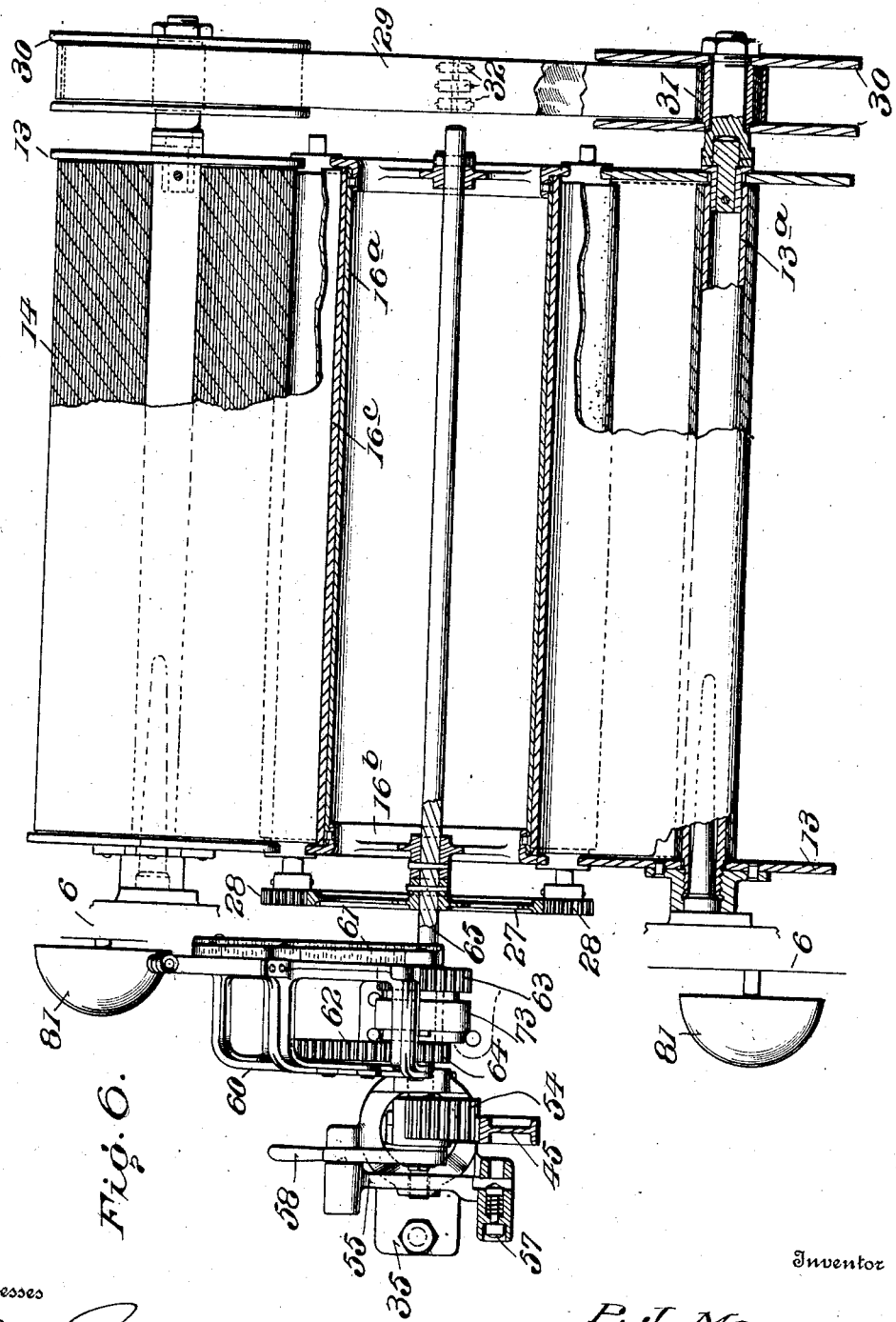

No. 838,126. PATENTED DEC. 11, 1906.
P. J. MANN.
STATION INDICATOR.
APPLICATION FILED MAY 3, 1906.

8 SHEETS—SHEET 5.

Witnesses

Inventor
P. J. Mann.
By
R. H. A. P. Lacey, Attorney

No. 838,126. PATENTED DEC. 11, 1906.
P. J. MANN.
STATION INDICATOR.
APPLICATION FILED MAY 3, 1906.

8 SHEETS—SHEET 6.

Witnesses
Inventor
P. J. Mann.
By
R. A. & P. Lacey, Attorneys

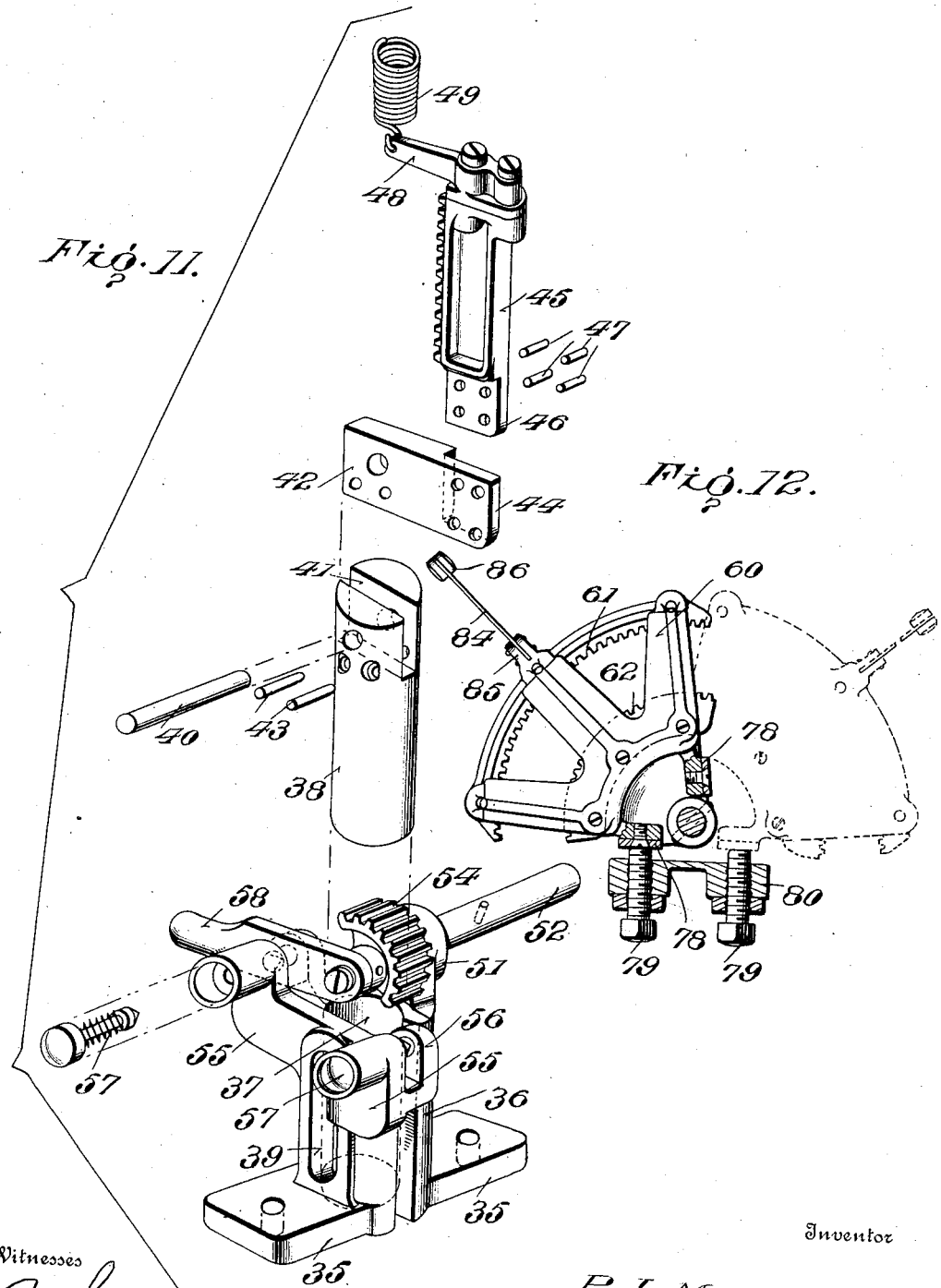

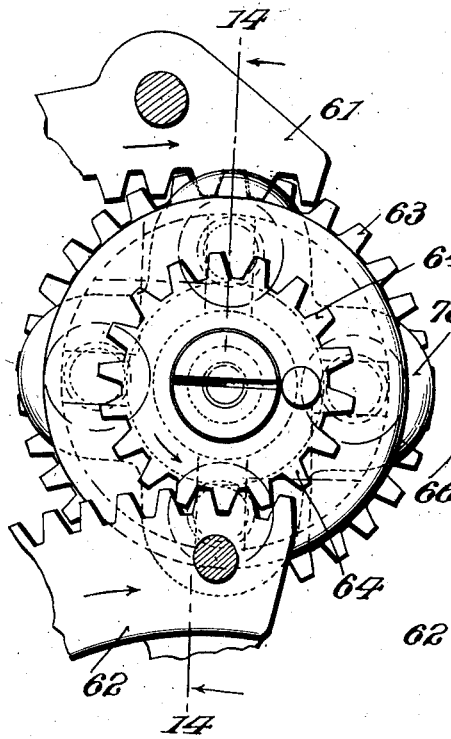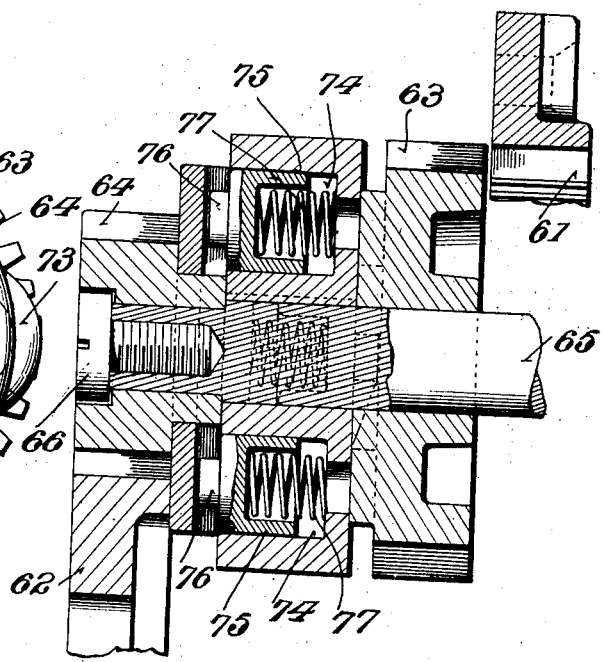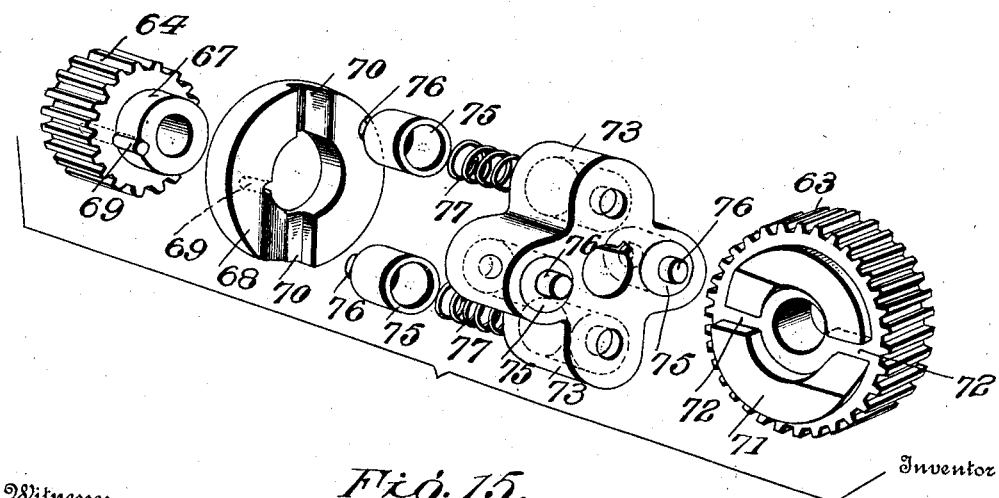

UNITED STATES PATENT OFFICE.

PETER J. MANN, OF PITTSBURG, PENNSYLVANIA.

STATION-INDICATOR.

No. 838,126.  Specification of Letters Patent.  Patented Dec. 11, 1906.

Application filed May 3, 1906. Serial No. 315,088.

*To all whom it may concern:*

Be it known that I, PETER J. MANN, a citizen of the United States, residing at Pittsburg, in the county of Allegheny and State of Pennsylvania, have invented certain new and useful Improvements in Station-Indicators, of which the following is a specification.

This invention relates to that class or type of station-indicators that are arranged to be intermittently actuated by means of a trip-block along the track. By "station-indicator" is meant to include particularly street-crossings, for my invention is adapted for use with trolley or other cars of street-railways, and in the preferred embodiment of the invention it is proposed to arrange the street-indicator or station-indicator so that it will display an advertisement at the same time that it displays the next station or street, so that the passengers will have their attention attracted to the advertising matter.

The object of my invention is to provide an improved apparatus of this character embodying such novel and mechanically-correct features of construction, arrangements, and combinations of the parts that the apparatus may be depended upon at all times to automatically act in an efficient manner to feed the display-web containing the names of the street-crossings or stations and the advertising matter a predetermined distance at each actuation, so that the series of display matter, each of which includes the name of a street and advertisement, will be successively brought in an accurate manner to the display-openings of the casing no matter how long the apparatus may be in use, and without the necessity of any hand adjustment to correct the feeding of the web.

A further object of the invention is to provide an apparatus of this nature embodying improved means for reversing the traverse of the display-web at the end of the route when the car begins its return trip, this being all the attention that is necessary to be bestowed upon the apparatus by the conductor or motorman of the car; and a further object of the invention is to provide such apparatus with improved electrically-controlled actuating means in which an electromagnet is employed to positively actuate the display-web intermittently in both directions—that is, when it is feeding forwardly as well as rearwardly—the major parts of the actuating device always working in the same direction.

With these and other objects in view, as will more fully appear as the description proceeds, the invention consists in certain constructions, arrangements, and combinations of parts hereinafter fully described and claimed.

For a full description of the invention and the merits thereof and also to acquire a knowledge of the details of construction of the means for effecting the result reference is to be had to the following description and accompanying drawings, in which—

Figure 2:
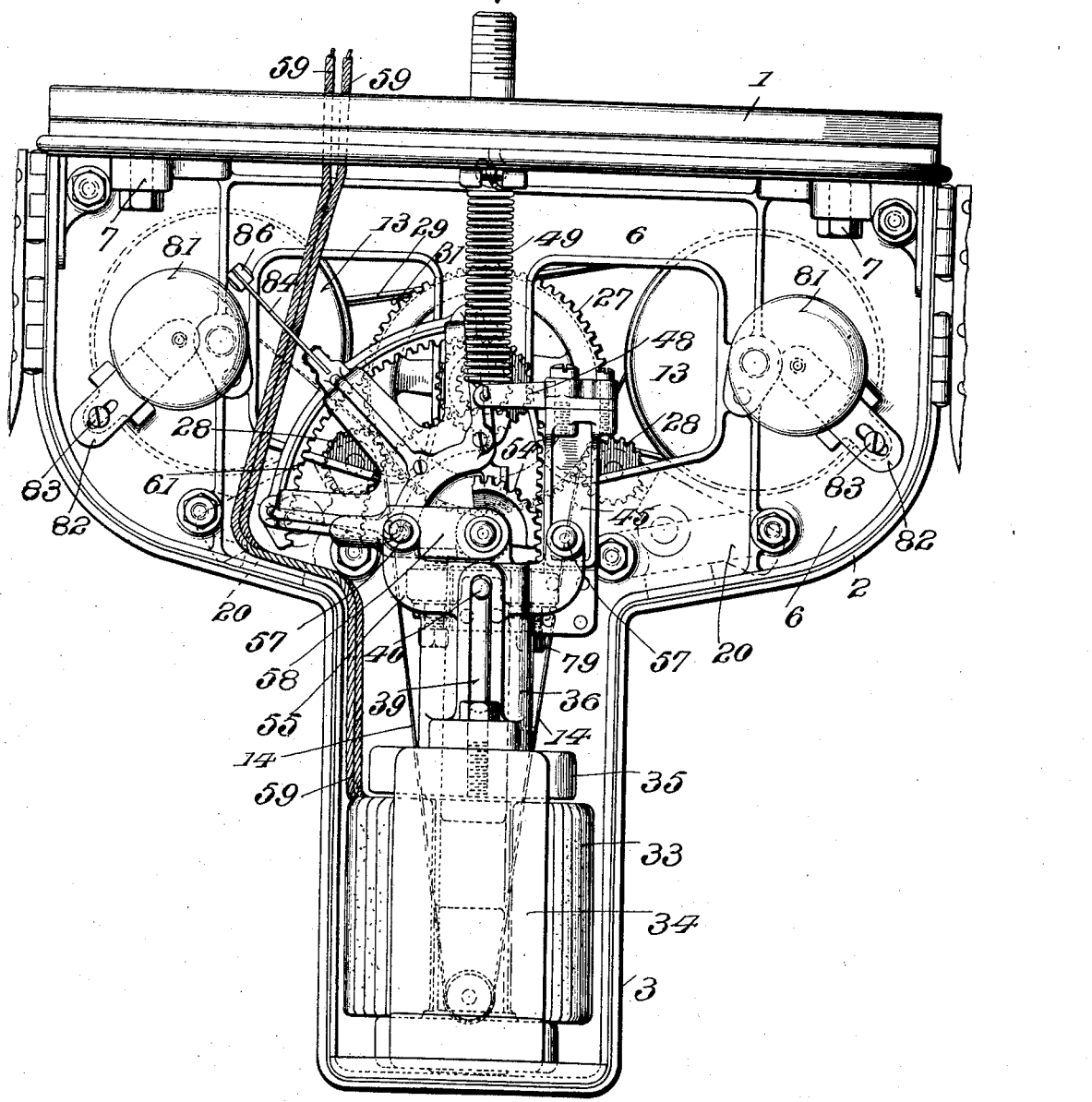
Figure 7:
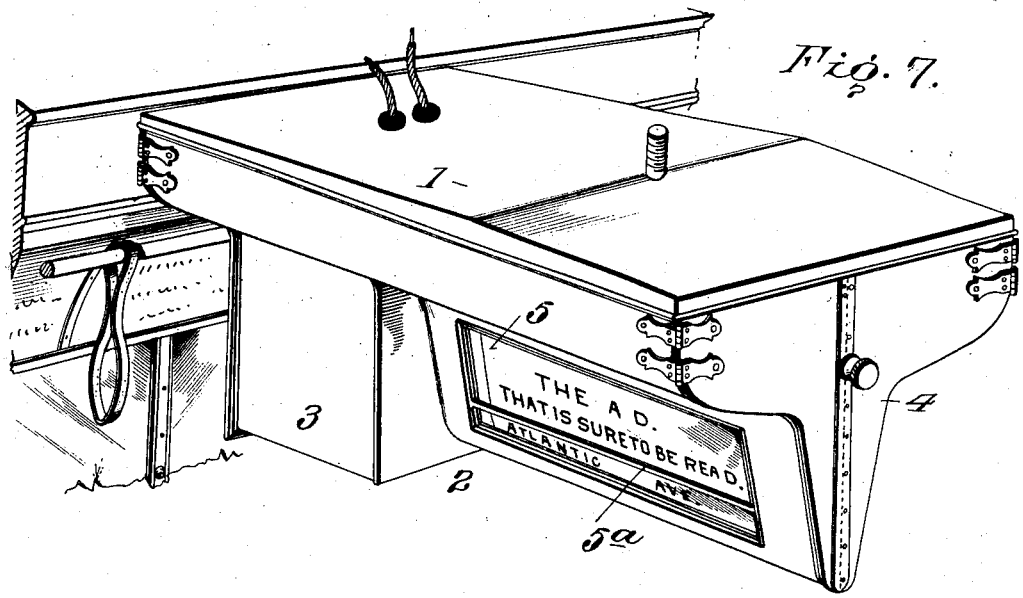
Figure 8:
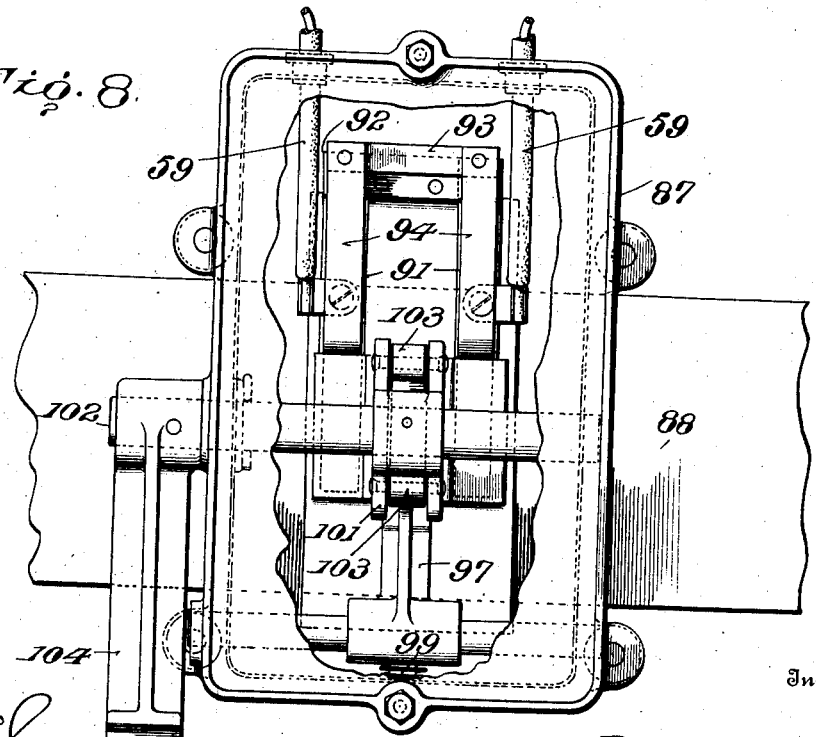
Figure 9:
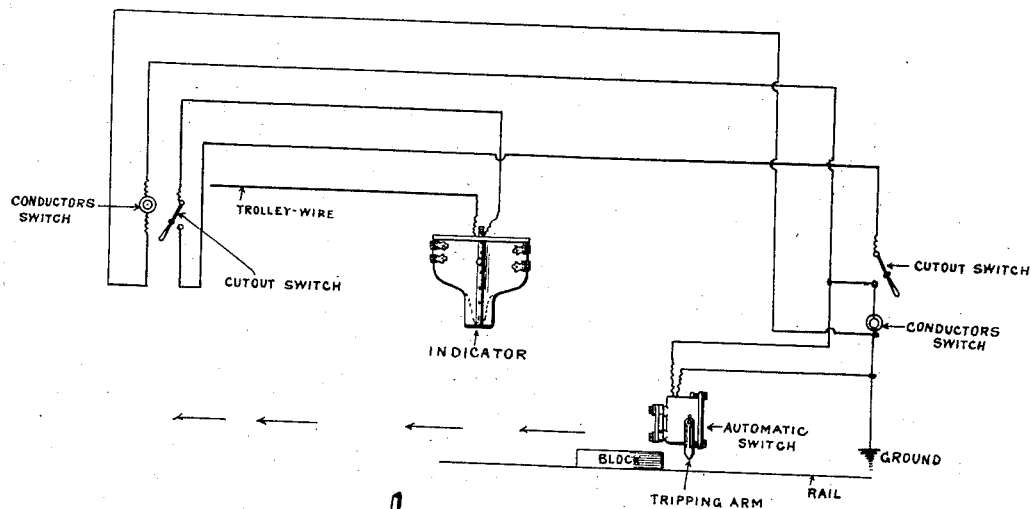
Figure 10:
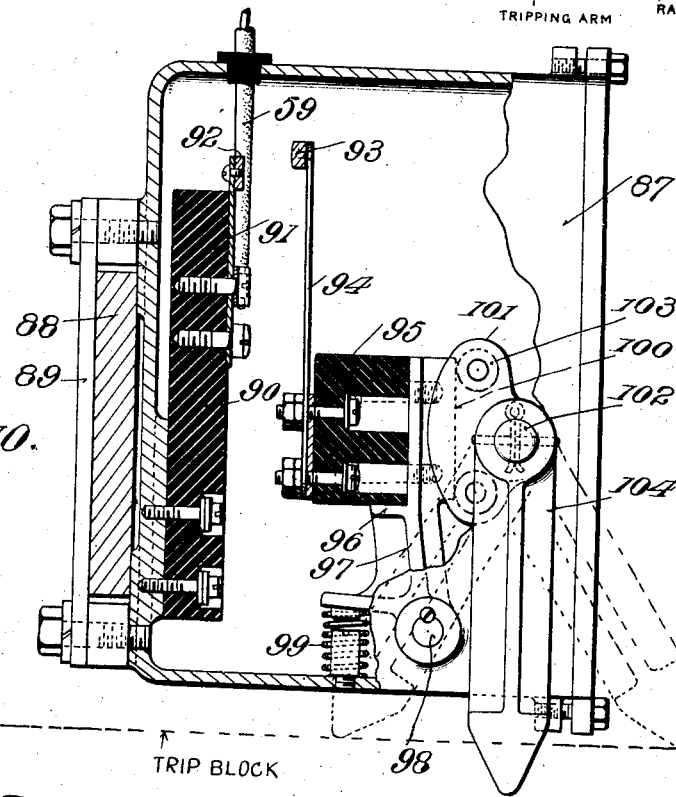

Figure 1 is a longitudinal sectional view of my improved indicator, parts being shown broken away and in side elevation. Fig. 2 is an end elevation of the apparatus looking into the same from the left of Fig. 1, the doors of the casing being thrown open. Fig. 3 is a similar view looking from the right of Fig. 1, parts being partially broken away. Fig. 4 is an enlarged detail sectional view illustrating one of the tension-rolls and its mounting at one side of the apparatus. Fig. 5 is a detail perspective view of one of the shafts for the tension-rolls. Fig. 6 is a horizontal sectional view of the working parts, a portion of the same being broken away and other parts being shown in full, the casing or supporting parts being omitted and one support being indicated at the left by single lines. Fig. 7 is a detail perspective view on a reduced scale and illustrates one embodiment of the entire apparatus as it would appear in practical application. Fig. 8 is a detail front elevation of the automatic switch employed to close the electric circuit for intermittently actuating the apparatus, the casing of said switch being broken away to show the interior parts. Fig. 9 is a diagrammatic view of the wiring that may be employed in connection with the apparatus. Fig. 10 is a detail sectional view of the automatic switch, a part of the casing being partially broken away and other parts being shown in side elevation. Fig. 11 illustrates in detail perspective a portion of the actuating-gear, the parts of which are shown drawn out or projected from each other in substantially operative alinement and in juxtaposition to each other. Fig. 12 is a detail view illustrating the two positions of the actuating-segments and the casting which supports them and the hammer for the bell in both full and dotted lines. Fig. 13 is an enlarged detail view illustrating a portion of the two rack-segments, and their relatively operative positions with respect to the two pinions that they actuate. Fig. 14 is an enlarged detail sectional view of the parts shown in Fig. 13, the section being taken substantially on the line 14 14 of Fig. 13. Fig. 15 illustrates in detail perspective the two actuating-pinions designed to coact with the before-mentioned rack-segments and also illustrates the double-acting clutch member interposed between the same and designed to effect in combination with one of said segments or the other the traverse of the display-web in one direction or the reverse.

Corresponding and like parts are referred to in the following description and indicated in all the views of the drawings by the same reference characters.

My invention comprehends an apparatus which is electrically actuated by the intermittent closing of an electric circuit at a predetermined distance before the approach or arrival of the car at a station or street-crossing, and for the sake of clearness I deem it best to first describe the mechanical features of the apparatus itself and then the automatic actuating-switch for closing the circuit to bring the mechanical features of the apparatus into action.

All of the operative elements of the apparatus itself are mounted within a casing designed to be suspended from the ceiling of the car at about the middle thereof and adapted to display a street or station and an advertisement intermittently at both sides of the casing, so that both the street and advertisement may be read by every passenger in the car. Preferably in all instances the angle of the opening through which the indicia are displayed is in a slightly-oblique plane, so that the matter is presented at right angles to the line of vision, although the casing itself may be formed in different shapes and designs, according to the different existing conditions to which the apparatus must conform.

One design of casing is shown in the present instance, attention being particularly directed to Figs. 1 and 7, from which it will be seen that the casing embodies a top plate 1, a body 2, having a substantially square box or casing 3 at one end for the accommodation of a portion of the operative elements, and doors 4 at each end of the casing. The top plate 1 is preferably slightly convex from a point at one side of its center toward both ends, so that it may conform to the ceiling of the ordinary car and at the same time be placed to one side of the center of the car, so that there may be sufficient clearance at one end of the casing to withdraw the rolls carrying the display-web. The body 2 is in the present instance provided with a display-opening 5, preferably covered by glass to exclude the dust, and divided by a partition-bar 5$^a$ into upper and lower portions, one of which is intended for the display of the "ad." and the other for the display of the name of the street or station. The doors are shown in the present instance as hinged to the upper corners of the casing in such a manner that they may be swung outwardly and expose the interior for the purpose of withdrawing the rolls, turning the reversing-lever, or for any other purpose.

Within the casing before described and near one end thereof (near that end which is at the left in Fig. 1) is mounted a vertically-extending supporting-plate 6, which is screwed to the top 1, as illustrated at 7, and is secured near its lower end by a stay-bolt or tie-rod 8 to a companion plate 9 near the opposite end of the casing. The latter is comparatively long and tapering, as illustrated in Fig. 3, and is secured at its upper end to a downwardly-extending flange 10, depending from the top 1. These two plates 6 and 9 support either separately or conjointly practically all of the operative parts of the apparatus.

Referring particularly to Fig. 3, a horizontally-extending yoke 11 is rigidly secured, by means of a thumb-nut 12, to the supporting-plate 9, the two arms of said yoke extending on opposite sides of said plate and serving as a support for one end of two reels 13. The opposite ends of the said reels are supported directly in bearing apertures or bosses formed in the supporting-plate 6, as illustrated in Figs. 1 and 2. The display-web 14 is intended to unwind from one of the reels 13 and wind up upon the other, and in the movement of said web it passes between tension-rolls 15 and a measuring-cylinder 16. The measuring-cylinder 16 is journaled at its ends between the plates 9 and 6, and it is located between the two reels 13 in a slightly-lower plane, as indicated in Fig. 3. As the tape unwinds from one of the reels 13 it is passed between the adjacent tension-roll 15 and the surface of the measuring-cylinder 16, which is the driving-cylinder of the apparatus, and it then passes downwardly across one display-opening 5 and around an idle roller 17 at the bottom of the casing and thence upwardly alongside of the opposite display-opening between the other tension-roll and the measuring-cylinder and is wound up upon the other reel 13. It is to be understood that in the normal relation of the parts the web is caught and fed positively between the tension-rolls on both sides of the feed-cylinder and said cylinder, so that as the latter always has a predetermined movement the web will be sure to have imparted to it the desired traverse at each movement of the cylinder, and the advertisements and names of streets or stations will always be accurately positioned in front of the display-openings. These advertisements and names of streets or stations are manifestly arranged in duplicate, so as to be read from either side of the casing, and the traverse of the web at each movement is such that the duplicate names and "ads." will be carried clear of both openings and a successive duplicate presented thereto. The reels 13 are preferably constituted by hollow tubes of brass or the like 13ª, and the measuring-cylinder is preferably constituted by a brass tube 16ª of substantially larger diameter, at the ends of which are secured flanged heads 16ᵇ, and said tube 16ª is preferably covered with a hard-rubber sleeve 16ᶜ, all as best shown in Fig. 6. The tension-rolls 15 are preferably provided with comparatively soft-rubber peripheries, and they are carried at their outer ends in bearings 18, one of which is shown in detail in Fig. 4. Each bearing 18 is provided with an arm 19, mounted within a casting 20, and each of said arms is provided along one edge with a rack 21. It is to be understood that these arms 19 are four in number and are located in two pairs at opposite ends of the casing and those at one end of the casing are provided with sockets or recesses 22, as illustrated in Figs. 3 and 4, while those at the opposite end of the casing (indicated in dotted lines in Fig. 2) are not so provided. Springs 23ª are mounted in the castings 20 at the rear ends of the arms 19 and have a tension to press said arms outwardly, so as to carry the tension-rolls into frictional engagement with the measuring-cylinder 16 or the tape interposed between said cylinder and the rolls. Transverse shafts 23 are mounted in the castings 20, and said shafts carry at each end a pinion 24, as illustrated in Fig. 5, said pinions meshing with the racks 21 of the arms 19. Each shaft 23 is provided with a milled knob 25 at one end, by which the conductor or motorman or other attendant may turn the shafts 23, which will obviously result in moving the arms 19 rearwardly in the casting against the tensions of the springs 23ª, and pivoted catches 26 are provided for the arms 19 at one end of the casting, that are formed with the recesses 22, so that when said arms are retracted and the tension-rolls moved away from the measuring-cylinder the nose of said latch will be automatically entered in its respective recess and will hold the tension-roll 15 in an inoperative retracted position. To allow said rolls to again move into an operative position, it is only necessary that the two catches 26 at one end of the casing be retracted, whereupon the springs 23ª will automatically force the arms 19 and the tension-rolls 15 outwardly, and the springs 23ª will maintain the tension-rolls 15 in proper frictional contact with the web 14 and the measuring-cylinder 16.

At one end, as best seen in Figs. 1 and 2, the measuring-cylinder 16 is provided with a gear-wheel 27, and the tension-rolls at their adjacent ends are also provided with toothed pinions 28, which mesh with the gear-wheel 27, so that a positive movement will always be imparted to the tension-rolls from the measuring-cylinder and there will always be insured that the predetermined amount of web will be fed from one reel onto the other at every revolution of the cylinder and without any slipping of the web. In the present instance it is intended that the measuring-cylinder 16 shall have one complete revolution at every actuation of the apparatus, and it is therefore manifest that the amount of web fed from one reel onto the other at every actuation may be determined by the diameter of said measuring-cylinder, cylinders of different diameters being provided whenever it is desired to change the amount of web fed at one actuation.

As has been before stated, the measuring-cylinder 16 is the driving and feeding cylinder for the web, coacting in this function with the tension-rolls 15, and it is therefore obvious that when the apparatus is set to work from left to right, as viewed in Fig. 2, the web will be positively drawn off of the left-hand reel and the same amount of web positively drawn up between the right-hand tension-roll 15 and the cylinder 16. Some means, however, must be provided to wind the web positively upon the right-hand reel 13 to produce a successful machine, and for this purpose I have provided an equalizing device or mechanism which is best seen by reference to Figs. 1, 3, and 6. This mechanism is so arranged, as will now be set forth, that it will wind up either reel 13 positively to take up the proper amount of web on the rewind no matter which of the two reels is the winding-up reel. The said mechanism consists of an endless belt 29, which passes over the two spools 30, that are mounted, respectively, on extensions of the shafts of the two reels 13. The tape 31 is secured at its ends to the two spools 30 and is intended to wind from one spool to the other. This tape is exactly the same length as the display-web 14 and is mounted underneath the belt 29 and is covered thereby. The belt 29 has its ends connected together by a spring coupling or clamp 32 to allow it to yield sufficiently to compensate for its different shapes according to the amount of tape 31 wound upon the respective spools 30.

From the foregoing description it is obvious that as the web is unwound from one reel and wound up upon the other the tape 31 will likewise be unwound from one spool and wound up upon the other and the belt 29 will manifestly drive the wind-up spool at exactly the required speed to turn the wind-up reel 13 fast enough to always maintain the web in a tautly-wound condition around the same.

It is to be understood that the function of the tape 31 and the belt 29 is only that of winding up the take-up reel of the two reels at the proper different speeds, and it is obvious that if this mechanism were not provided or some analogous mechanism the web could not be fed accurately at each actuation of the apparatus, because, for instance, with the left-hand reel full and the right-hand reel empty the latter will have to be driven at a much higher speed than when both reels have the same amount of web upon them. It is for the purpose of always compensating for the different amounts of web upon the respective spools that the tape 31 and the belt 29 and spools 30 are provided. It is to be noted that the belt 29 has no connection whatever with the cylinder 16, which is the driving-cylinder, and it is only connected to the shafts of the two reels 13 by means of the extensions of said shafts and the spools thereon. Having now described the traverse of the display-web and how the same is mounted, I shall proceed to describe the actuating mechanism for imparting an intermittent movement to the web. In this connection special reference is to be had to Figs. 1, 2, 6 and 11 to 15, inclusive.

Within the extension 3 of the body 2 of the casing is mounted an electromagnet 33, held within a yoke-frame 34, which is bolted to the plate 6, as shown. Upon the yoke-frame 34 is a bracket 35, rigidly secured thereto and provided with an upward extension 36, formed with vertical bore 37, designed to receive the core 38 of the magnet and to guide the same in its vertical reciprocating movement. The upwardly-projecting arm 36 is provided at one side with a guide-slot 39, designed to receive a guiding-pin 40, projecting from one side of the core. The core 38 is provided at its upper end with a slot 41, in which a plate 42 is secured by means of pins 43 or the like. The plate 42 is provided with a lateral extension 44, and a rack-bar 45 is provided with a recessed lower extension 46, secured to the extension 44 by means of pins 47 or the like. The upper end of the rack-bar 45 carries a laterally-projecting finger 48, and a helical spring 49 is secured at one end to said finger and is secured at its upper end to a hook 50 in the top 1 of the casing. The core 38 and the rack-bar 45 and their related parts constitute a plunger. The upwardly-projecting arm 36 of the bracket 35 is provided with a journal-bearing 51, in which a stub-shaft 52 is journaled. The said shaft is received in a suitable bearing in the plate 6, as illustrated in Fig. 1, and is mounted to turn about its longitudinal axis and to slide longitudinally, and it is pressed upon to slide it longitudinally in one direction by means of a spring 53, coiled around it and seated in a boss in one side of the plate 6. The shaft 52 carries near one end a toothed segment 54, designed to be engaged by the teeth of the rack-bar 45 and of such width, as illustrated best in Fig. 1, as to permit the predetermined longitudinal movement of the shaft 52, which carries it, without ever becoming disengaged from the said rack. The upwardly-projecting arm 36 of the bracket 35 also carries two forwardly-extending fingers 55, each of which is provided with an upwardly-opening slot 56 and a spring-pressed locking-pin 57, designed to extend into said slot. These locking-pins 57 are intended to coact with a locking-lever 58, which is mounted to turn on the outer end of the shaft 52. The two slots 56 are in different vertical planes and out of alinement with each other, as illustrated in Figs. 11 and 6, for a purpose to be presently described.

The magnet is provided with leads 59, and when the magnet is energized by the closing of the electric circuit the core 38 will be drawn downwardly within the coil of the magnet, and as said core carries the rack 45 it will cause the same to move downwardly and effect the rotation of the shaft 52 through the instrumentality of the toothed segment 54.

Keyed upon the shaft 52 is an open-frame casting 60, to which two rack-segments 61 and 62 are secured in different vertical planes, as best seen in Figs. 1 and 6. As shown in Fig. 13, the two rack-segments 61 and 62 are designed to mesh, respectively, with two pinions 63 and 64, carried by an extension 65 of the shaft of the measuring-cylinder 16, and the arrangement is such, as will be now described, that when the rack-segment 61 and the pinions 63 are meshing the shaft 65 and the measuring-cylinder 16 will be turned in one direction to cause a traverse of the web 14 in one direction, while when the smaller rack-segment 62 and smaller pinion 64 are in mesh a reverse movement will be imparted to the shaft 65 and the cylinder 16 to effect the reverse traverse of the web 14. The arrangement by which this is accomplished is as follows: The extension 65 of the measuring-cylinder 16 carries at its extreme outer end the smaller pinion 64, which is held thereon by means of a screw 66, and which is free to turn on the shaft except when coupled thereto by specially-provided means. The pinion 64 is provided at one side with a tubular extension 67, over which a clutch-disk 68 fits, the two parts being securely held to turn together by means of a pin-and-slot connection 69. The clutch-disk 68 is provided with two diametrically opposite recesses 70, and one wall of each recess is inclined, as shown, while the opposite wall is abrupt and provides a shoulder. The pinion 63 is also free to turn upon the shaft 65, except as hereinafter described, and is formed on one face with a clutch-disk 71, also provided at diametrically opposite points with recesses 72, one wall of each of said last-named recesses being beveled, as shown, while the opposite wall is abrupt and constitutes a shoulder. Interposed between the two pinions 84 and 63 and keyed upon the shaft 65 is an automatic coupling member 73, which is provided on each face with a pair of sockets 74, receiving the hollow shanks 75 of pins 76. Springs 77 are received within the hollow shanks of the pins 76, and also within the sockets 74, and are designed to press said pins into outer position, where they will project from the face of the automatic coupling member 73, and the proportion of the parts is such that said pins may retreat into the sockets 74 to a point within or flush with the faces of the coupling member 73 when pressed upon against the tension of the springs.

When the smaller rack-segment 62 is in engagement with the smaller toothed pinion 64, it is evident that a movement of said rack-segment in the direction of the dart in Fig. 13 will first drive the pinion 64 in the direction of the dart applied thereto. This movement will cause the shoulders of the slots 70 to engage with the adjacent pins 76, and consequently will positively turn the coupling member 73 and shaft 65 in a direction to revolve the cylinder 16 in one direction and cause a traverse of the web 14 in one direction. The prime mover of this operation is the electromagnet with its core 38 and their connected parts, and as soon as the magnet becomes deënergized the spring 49 will return the parts to their original positions, and in this reverse movement of the rack-segment 62 and pinion 64 the beveled walls of the slot 70 will merely ride upon the pins 76 and cause the latter to retreat into the coupling member 73, and will consequently have no effect upon the coupling member or the shaft 65, upon which it is mounted.

When the larger segment 61 is engaged with the larger pinion 63, it is manifest that a forward movement of said rack-segment will turn the pinion 63 in a direction reverse to the forward movement of the pinion 64, before described. This will result in positively actuating and turning the coupling member 73 and the shaft 65 in a direction reverse to that described, on account of the engagement of the shoulders on the slots 72 with the projecting pins 76 on that side of the coupling member, while the reverse movement of said rack-segment will have no driving effect upon the coupling member 73 and the shaft 65, as the beveled walls of the slots 72 will merely ride over the pins 76 and force them back into their housing 74. It will be noted, therefore, that the two segments 61 and 62 always have the same reciprocating or oscillatory movement—that is, from the left, as shown in Figs. 2 and 12, to the right and back again—and that it depends entirely upon which of the rack-segments is in mesh with its respective pinion as to how the web will be moved—that is, whether it is to be moved from the left-hand reel 13 (shown in Fig. 2) to the right-hand reel, or vice versa. The teeth of the rack-segment 61 and pinions 63 and 64 are so related that the complete movement of the casting 60, carrying said segments, will merely effect one complete revolution of the cylinder 16.

From the foregoing description it is to be understood that when the rack-segment 61 is in mesh with its pinion 63 or when the rack-segment 62 is in mesh with its pinion 64 the pinion not in mesh is free from its rack-segment and will always travel with the automatic coupling 73, due to pressure of pins 76 in their respective mating slots. The accurate position of the pinions 63 and 64 for changing to the forward or reverse movement of the web is due to the above action of pins 76 in their mating slots.

The casting 60, which is keyed upon the shaft 52, is provided near its base and at opposite sides with two wearing-plates 78, that are designed to abut against limiting-screws 79, adjustably mounted in a ledge 80, projecting from one side of the supporting-plate 6. Hence by adjusting these screws 79 the movement of the casting 60, carrying the said segments 61 and 62, may be accurately limited to insure the desired throw of the segments for their intended function.

It has been described, then, that the movement of the display-web 14 in one direction or the reverse depends upon which rack-segment and pinion are in mesh. To change the engagement of the respective rack-segments and pinions, the shaft 52 is provided with its longitudinal and rotary movements. Its rotary movement is the driving movement which effects the required swing of the casting 60, carrying the segments, and its longitudinal movement, as is obvious, will carry the casting 60 outwardly or inwardly, as the case may be, to change the engagement of the segments and their respective pinions For instance, as indicated in Fig. 14 and shown clearly in Fig. 6, the shaft 52 has been moved to carry the segment 61 out of engagement with its pinion 63 and the segment 62 into engagement with its pinion 64. In this position the locking-lever 58 will be swung over into the innermost slot 56, as indicated in Fig. 11 also, and the spring 53 will be compressed. To effect the change in the meshing of the segments and pinion, it is only necessary for the attendant to release the lever 58 from the innermost slot 56, whereupon the spring 53 will move the shaft 52 outwardly in a longitudinal direction and carry the casting 60 outwardly, and this manifestly will draw the segment 61 into engagement with the pinion 63 and carry the segment 62 out of engagement with its pinion 64 to effect a movement of the display-web in the reverse direction. The lever 58 may then be swung over and entered into the outermost slot 56, which will secure the parts in their proper adjusted position so long as desired. The locking-pins 57 are provided to securely hold the lever 58 after it has been actuated, as described.

It is proposed in the preferred embodiment of my invention to provide an audible signal designed to call the passengers attention to the change in the indicator and to likewise call their attention to the advertisement. This audible signal, in the present instance, comprises two gongs 81, that are carried by arms 82, adjustably secured by means of slots and pins 83 to the supporting-plate 6, so that they may be moved to different positions and maintained in proper relation to the hammer. The hammer 84 to sound the signals is preferably carried by the casting 60, which also carries the segments 61 and 62, and it is a vibratory member held in a short arm 85 to about the center of the casting and carries at its outer end the hammer proper, 86. It is to be particularly noted, as best seen in Fig. 6, that the gongs 81 are located out of alinement with each other, and this provision is made on account of the different relative positions of the castings 60, as above described, in the event the apparatus is feeding the web in one direction or the reverse. In the position shown in Fig. 6 it is evident that the hammer 86 will strike one gong at the edge thereof where it will secure the best results, and it is also evident that in the throw of the casting 60 it will not strike the other gong, but moves in a path to one side of it; but when the casting 60 is moved out farther to change the gearing it is evident by an inspection of Fig. 6 that the other gong will be struck, while the gong illustrated in operative position in Fig. 6 will not be struck. Hence by this arrangement only one gong is struck at every actuation of the apparatus, and the gongs are struck at their edges where the best tone results are secured by the arrangement of the gongs, as before described, without the necessity of adjusting either gong in or out—that is, toward its supporting-plate 6.

The foregoing description refers, primarily, to the mechanically-operating parts of the apparatus, and it now remains to describe the electrical devices that serve to effect the intermittent actuation of the apparatus. Referring particularly to Figs. 8, 9, and 10, 87 designates the casing of an automatic switch, which is preferably carried by the truck of the car, and 88 designates a beam of the truck or one of the trucks to which the casing is clamped by means of a bar 89. In this casing is mounted an insulating-block 90, to which the leads 59 of the electromagnet 33 are connected, and connected to this block are the terminals or contact-plates 91, provided with brushes 92. These contact-plates are designed to be bridged by a brush 93, carried on the outer ends of spring-arms 94, and said arms are carried by an insulating-block 95, supported in the angular socket 96 of one arm of the bell-crank lever 97. The said lever is mounted at about the center of a transverse shaft 98 in the casing 87, and underneath the other arm of said lever is a spring 99, designed to press against said lever and throw it in a direction where the bridge-contact 93 will be out of engagement with the brushes 92 of the contact-plates 91. The bell-crank lever 97 is provided on its upwardly-projecting arm with a vertical rib or flange 100, which fits between ears 101, secured to another transverse shaft 102. The said ears 101 carry rollers 103, that are designed to engage the rib 100, and an arm 104 is secured to the shaft 102 at one side thereof outside of the casing and is designed to contact with and be swung by a block along the track, as indicated in Figs. 9 and 10. From the arrangement described it will be seen that as a car reaches the block the lower end of the arm 104 will contact therewith no matter in which direction the car is going, and the said arm will be swung in one direction or the other and ride upon the block and be maintained in an angular position (indicated by the dotted lines in Fig. 10) so long as it contacts with said block. As the arm is swung to its angular position it will cause either one or the other of the rollers 103 to ride as a cam upon the rib 100 and rock the bell-crank lever 97 in a direction against the tension of its spring to bridge the contact 91 by means of the bridge-piece 93, and thereby close and maintain in closed position the electric circuit through the electromagnet 33. The circuit is thus maintained closed so long as necessary to effect the actuation of the parts before described, and the period in which the circuit is to be closed is manifestly to be proportioned to the normal speed of the car, the trip-block being made longer or shorter, as is necessary for the conditions existing upon different lines where my apparatus is installed. The circuits are indicated in Fig. 9, and it will be noticed in said figure that in addition to the automatic switch shown in Figs. 8 and 10 the circuits include cut-out switches at each end of the car, so that the conductor or motorman may throw the device entirely out of operation, if desired, and said circuits also include conductors' switches, as indicated, in the form of push-buttons, so that the conductor or motorman may manually effect the actuation of the device whenever necessary. I do not contemplate that this will ever be necessary owing to any failure of the device to properly register; but it is manifest that in actual service it will sometimes be necessary for a car to skip one or more trip-blocks for some reason—as, for example, when in case of a breakdown or under other circumstances it becomes necessary for a car to cross over from one track to the other and go around one or more trip-blocks. The expediency of the conductor's switch for manually actuating the apparatus is therefore apparent. As the spring-arms 94 move in the arc of a circle toward and from the contact-plates 91 it is obvious that the bridge-contact 93 will have a wiping action against the contact-plates and tend to keep the contacts clean at all times and free from injurious blistering.

The operation of the various parts having been described above in connection with the structural features of the apparatus, further description of the operation is believed to be unnecessary.

Having thus described the invention, what is claimed as new is—

1. In an apparatus of the character described, the combination of the two reels, a display-web arranged to wind from either reel to the other, a measuring-cylinder and two tension-rolls designed to positively grip the web and feed it from either reel to the other, two spools mounted to turn with the two reels respectively, a tape arranged to wind from one spool to the other and of substantially the same thickness and length as said display-web and a yieldable endless belt mounted over said spools and extending around the said tape, as and for the purpose set forth.

2. In an apparatus of the character described, the combination of the reels, the display-web arranged to wind from one reel to the other, the measuring-cylinder, means for driving said cylinder, the tension-rolls yieldably mounted and designed to grip between them and the cylinder the said web, and means for holding said tension-rolls in a retracted and inoperative position.

3. In an apparatus of the character described, the combination of the reels, the display-web, means for winding the display-web from one reel to the other, the revoluble cylinder interposed between said reels, spring-pressed tension-rolls designed to grip the web between them and the cylinder, means for adjusting said tension-rolls away from the cylinder and means for automatically locking said tension-rolls in said adjusted position.

4. In an apparatus of the character described, the combination of the reels, the display-web, means for winding the display-web from one reel to the other, a cylinder and tension-rolls between which the web is designed to pass, the said tension-rolls being spring-pressed toward said cylinder, means for adjusting said tension-rolls away from said cylinder, and manually-releasable means for automatically retaining said tension-rolls in said adjusted position.

5. In an apparatus of the character described, the combination of the reels, the display-web, means for winding the display-web from one reel to the other, a measuring-cylinder, tension-rolls designed to press the web against said cylinder in the traverse of the web from one roll to the other, arms carrying said tension-rolls, castings in which said arms are mounted, springs tending to force said arms out of the castings, the arms being provided with recesses, and a spring-catch mounted on the castings and designed to enter said recesses in the arms to hold the arms and tension-rolls in retracted position.

6. In an apparatus of the character described, the combination of the reels, the display-web, means for winding the said web from one reel to the other, a measuring-cylinder mounted between said reels, tension-rolls designed to press the web in its traverse against the said cylinder at opposite sides thereof, arms carrying said tension-rolls and provided with racks, said arms being spring-pressed toward the cylinder, means for movably supporting said arms, and manually-operable pinions meshing with said racks and designed to retract the arms.

7. In an apparatus of the character described, the combination of the reels, the display-web, means for winding said web from one reel to the other, a measuring-cylinder interposed between said reels, tension-rolls designed to press the web against said measuring-cylinder at opposite sides thereof, arms carrying said tension-rolls and provided at one side with a rack, transverse shafts provided at their ends with pinions meshing with said racks whereby a revolution of the shaft will move the arms, and means for automatically engaging sundry of said arms to hold the rolls retracted.

8. In an apparatus of the character described, the combination of reels, a display-web arranged to be wound from one reel to the other, a revoluble cylinder adapted to feed said web, a reciprocating plunger, means for actuating said plunger, the plunger carrying a rack, a toothed segment meshing with said rack, two segment-racks movable with said toothed segment, pinions mounted on the shaft of said cylinder and arranged to drive the same in one direction or the other, and means for alternately engaging each of said pinions with one of said rack-segments.

9. In an apparatus of the character described, the combination of the reels, a display-web adapted to wind from one reel to the other, a measuring-cylinder adapted to feed the web in either direction, a plunger, means for actuating said plunger, an oscillatory device operatively connected to said plunger and actuated thereby, said device including two segment-racks, two pinions operatively connected to said cylinder and arranged to drive the same each in an opposite direction, and means for engaging either of said racks with its respective pinion for the purpose specified.

10. In an apparatus of the character described, the combination of the reels, the display-web adapted to wind from one reel to the other, the measuring-cylinder adapted to positively feed the web in one direction or the reverse, the actuating device arranged to always oscillate back and forth with the same movement, means for moving said oscillating device longitudinally with respect to said cylinder, means whereby the said device will drive said cylinder, and means whereby the longitudinal adjustment of said oscillatory device will determine the rotation of said cylinder in one direction or the other.

11. In an apparatus of the character described, the combination of the reels, the display-web adapted to be wound from one reel to the other, the measuring-cylinder interposed between said reels and adapted to positively feed the web, the reciprocating plunger, means for automatically actuating the same, pinions carried on the shaft of said cylinder and arranged to drive the cylinder in opposite directions, means whereby the driving connection of each pinion is limited to one direction only, a rack-segment carrier operatively connected to said plunger and provided with two rack-segments designed to mesh one at a time with the respective pinions of the cylinder-shaft, and means for adjusting said carrier longitudinally whereby to change the gearing between the rack-segments and the pinions.

12. In an apparatus of the character described, the combination of the reels, the display-web adapted to be wound from one reel to the other, the cylinder adapted to feed the web positively, pinions operatively connected to said cylinder, one pinion being arranged to drive the cylinder in one direction only and the other being arranged to drive it in the opposite direction only, two oscillating segment-racks arranged to sweep around said pinions, means for actuating said racks, and means for adjusting said racks to bring either one of them in engagement with the adjacent pinion.

13. In an apparatus of the character described, the combination of the reels, the display-web adapted to be wound from one reel to the other, a cylinder adapted to feed said web, two pinions operatively connected to said cylinder, one being arranged to drive the cylinder in one direction only and the other being arranged to drive it in the other direction only, a shaft 52 mounted to turn about its longitudinal axis and also mounted to move longitudinally, a casting mounted on said shaft, two rack-segments carried by said casting and designed for engagement with the respective pinions, whereby the longitudinal movement of the said shaft will change the engagement from one pinion and segment to the other pinion and segment, means for turning said shaft, and means for holding said shaft locked in different longitudinally-adjusted positions for the purpose specified.

14. In an apparatus of the character described, the combination of the reels, the display-web adapted to be wound from one reel to the other, a cylinder adapted to feed said web, two pinions operatively connected to said cylinder, one being arranged to drive the cylinder in one direction only and the other being arranged to drive it in the other direction only, a shaft 52 mounted to turn about its longitudinal axis and also mounted to move longitudinally, a casting mounted on said shaft, two rack-segments carried by said casting and designed for engagement with the respective pinions, whereby the longitudinal movement of the said shaft will change the engagement from one pinion and segment to the other pinion and segment, means for turning said shaft, and means for holding said shaft locked in different longitudinal positions, said means including a manually-operable lever mounted on said shaft, and two receptive slots for said lever, said slots being arranged out of alinement with each other for the purpose specified.

15. In an apparatus of the character described, the combination of the reels, the display-web adapted to be wound from one reel to the other, a cylinder adapted to feed said web, two pinions operatively connected to said cylinder, one being arranged to drive the cylinder in one direction only and the other being arranged to drive it in the other direction only, a shaft 52 mounted to turn about its longitudinal axis and also mounted to move longitudinally, a casting mounted on said shaft, two rack-segments carried by said casting and designed for engagement with the respective pinions, whereby the longitudinal movement of the said shaft will change the engagement from one pinion and segment to the other pinion and segment, means for turning said shaft, and means for holding said shaft locked in different longitudinal positions, said means including a manually-operable lever mounted on said shaft, two receptive slots out of alinement with each other and locking-pins arranged to hold said lever in either one of said slots.

16. In an apparatus of the character described, the combination of the reels, the display-web arranged to be wound from one reel to the other, the measuring-cylinder arranged to positively feed the web and provided with a shaft extension, two pinions loosely mounted on said shaft and each provided with a clutch-disk formed with two opposite recesses one wall of each recess being beveled and the other constituting a shoulder, a coupling member interposed between said pinions and rigid with the said shaft, said coupling member being provided with depressible pins designed for locking engagement with the said shoulders, and means for turning either one of said pinions for the purpose specified.

17. In an apparatus of the character described, the combination of the reels, the display-web arranged to be wound from one reel to the other, the measuring-cylinder adapted to feed said web and provided with a shaft extension, two pinions loosely mounted on said shaft and each provided with a clutch-disk formed with a recess one wall of which is beveled and the other abrupt and designed to constitute a shoulder, a coupling member mounted on said shaft, said member being provided with a socket and a pin received in said socket and spring-pressed therefrom into operative relation with the said recess, and means for turning said pinions in two directions, the arrangement being such that when a pinion is turned in one direction the beveled wall of its clutch-disk will ride upon the pin and cause retraction thereof while in the other direction the abrupt wall or shoulder will engage with said pin and turn the shaft.

18. In an apparatus of the character described, the combination of a display-web and means for displaying the same, of two gongs arranged out of alinement with each other and in spaced-apart relation, a hammer designed to swing from one gong toward the other and means for changing the plane of movement of said hammer whereby it will contact with only one gong at a time.

19. In an apparatus of the character described, the combination of a display-web and means for displaying the same, said means including a swinging casting, means for moving said casting to swing in two different vertical planes for the purpose specified, a hammer carried by said casting, and two gongs arranged at opposite sides of said casting and in different vertical planes, as and for the purpose specified.

20. In an apparatus of the character described, the combination of the reels the display-web adapted to be wound from one reel to the other, the reciprocating plunger, means for automatically actuating the same, the broad segment 54, the partially-rotatable and longitudinally-adjustable shaft 52 carrying said segment, the rack carried on said plunger and meshing with said segment, the casting mounted on said shaft, the two segments carried by said casting in different vertical planes, the measuring-cylinder adapted to feed the display-web, the two pinions arranged side by side and operatively connected to said cylinder, one of said pinions being arranged to move the cylinder in one direction only and the other pinion arranged to move the cylinder in the reverse direction only, means for adjusting said shaft 52 longitudinally, the arrangement being such that the longitudinal adjustment will cause one or the other of the said segments to mesh with one pinion or the other, the lever 58 mounted on said shaft 52, the spring designed to move said shaft longitudinally in one direction, and the locking-slots out of alinement with each other and designed to receive said lever 58 and hold the same in the two different longitudinal adjustments on the shaft 52.

21. In an apparatus of the character described, the combination of a display-web and means for feeding the same forwardly, said means including an electromagnet, means for energizing the same, the magnet being provided with a movable core, a plate 42 secured to said core and provided with an extension projecting laterally in one direction, a rack-bar connected to said extension and extending vertically, said bar being provided with a finger projected laterally in a direction opposite to the extension of the plate 42, and a retracting-spring 49 connected to said finger.

22. In an apparatus of the character described, the combination of a display-web and means for feeding the same, said means including an electromagnet provided with a movable core means for energizing said magnet, a bracket secured to said magnet, and provided with a bore designed to guide said core and also provided with a guide-slot 39, a pin projecting from said core and mounted in said slot, and a spring-retracted rack-bar carried by said core.

23. In an apparatus of the character described, the combination of a display-web and means for feeding the same, said means including an electromagnet and means for energizing the same, a bracket mounted upon the frame of said magnet and provided with an upwardly-projected arm having a bore, a core 38 mounted to move in said bore, the said upwardly-projected arm of the bracket being also provided with two oppositely-extending fingers each of which is formed with an upwardly-facing slot, a rack-bar carried by said core, a shaft journaled at one end in the upwardly-projected arm of the bracket and provided with a toothed segment meshing with said rack, said shaft being longitudinally movable, a hand-lever mounted on the end of said shaft and designed for reception in either of the two upwardly-facing slots of the bracket-arm, said slots being out of alinement with each other, a driving-cylinder designed to frictionally engage the web and feed the same, and an operative connection between said shaft and said cylinder.

24. In an apparatus of the character described, the combination of reels, a display-web adapted to wind from one reel to the other, and means for feeding the web from one reel to the other and vice versa, said means including two oscillatory rack-segments arranged in different planes and connected together for simultaneous operation, means for oscillating said segments, two driving-pinions located in different planes, a shaft on which said pinions are mounted, clutching mechanism adapted to connect said pinions to their shaft so as to drive said shaft in one direction or the reverse, and means for moving said rack-segments so as to cause one of the same to mesh with one pinion, or the other to mesh with the other pinion, as and for the purpose set forth.

In testimony whereof I affix my signature in presence of two witnesses.

PETER J. MANN. [L. S.]

Witnesses:
J. D. YOAKLEY,
FREDERICK S. STITT.